(12) United States Patent
Yamamoto

(10) Patent No.: US 11,892,071 B2
(45) Date of Patent: Feb. 6, 2024

(54) BEARING UNIT AND SPEED REDUCER-EQUIPPED MOTOR

(71) Applicant: MABUCHI MOTOR CO., LTD., Chiba (JP)

(72) Inventor: Kazuyuki Yamamoto, Chiba (JP)

(73) Assignee: MABUCHI MOTOR CO., LTD., Chiba (JP)

( * ) Notice: Subject to any disclaimer, the term of this patent is extended or adjusted under 35 U.S.C. 154(b) by 0 days.

(21) Appl. No.: 18/042,769

(22) PCT Filed: Oct. 14, 2022

(86) PCT No.: PCT/JP2022/038360
§ 371 (c)(1),
(2) Date: Feb. 24, 2023

(87) PCT Pub. No.: WO2023/145150
PCT Pub. Date: Aug. 3, 2023

(65) Prior Publication Data
US 2023/0383834 A1   Nov. 30, 2023

(30) Foreign Application Priority Data
Jan. 27, 2022   (JP) ................. 2022-010860

(51) Int. Cl.
*H02K 7/08*   (2006.01)
*F16H 1/16*   (2006.01)
(Continued)

(52) U.S. Cl.
CPC .......... *F16H 57/021* (2013.01); *F16H 55/24* (2013.01); *H02K 7/081* (2013.01); *F16H 2057/0213* (2013.01)

(58) Field of Classification Search
CPC ............. F16H 1/16; H02K 5/167; H02K 5/24
(Continued)

(56) References Cited

U.S. PATENT DOCUMENTS 6,215,209 B1 * 4/2001 Yamamoto ............. H02K 15/14
310/90
6,393,929 B1   5/2002 Quere et al.

FOREIGN PATENT DOCUMENTS

CN     207530655 U  *  6/2018
CN     109861436 A     6/2019
(Continued)

OTHER PUBLICATIONS

International Search Report in PCT/JP2022/038360, dated Dec. 13, 2022, 5pp.
Written Opinion in PCT/JP2022/038360, dated Dec. 13, 2022, 9pp.

Primary Examiner — Jose A Gonzalez Quinones
(74) Attorney, Agent, or Firm — HAUPTMAN HAM, LLP

(57) ABSTRACT

A bearing unit includes: a thrust damper extendable in an axial direction of a shaft placed in a gearbox, the movement of which toward one side in the axial direction is regulated; a shaft receiver component held by the thrust damper on the other side of the thrust damper in the axial direction; a metal holder that holds the shaft receiver component in such a manner as to be detachable in the axial direction; and an oilless metal held by the metal holder and placed on the other side of the shaft receiver component, in which the thrust damper, the shaft receiver component, the metal holder, and the oilless metal are integrated all together before being incorporated into the gearbox.

10 Claims, 8 Drawing Sheets

(51) Int. Cl.
    *H02K 5/167*     (2006.01)
    *H02K 5/24*      (2006.01)
    *F16H 57/021*    (2012.01)
    *F16H 55/24*     (2006.01)

(58) Field of Classification Search
    USPC .............................. 310/90, 91, 75 R, 83, 99
    See application file for complete search history.

(56)                References Cited

FOREIGN PATENT DOCUMENTS

| DE | 102012107328 | A1 | * | 2/2013 | ........... H01R 39/415 |
|----|----|----|----|----|----|
| JP | S6318938 | A |  | 1/1988 | |
| JP | 2000510560 | A |  | 8/2000 | |
| JP | 2012135183 | A |  | 7/2012 | |
| JP | 201348550 | A |  | 3/2013 | |
| KR | 20190048417 | A | * | 5/2019 | |
| WO | 9959235 | A1 |  | 11/1999 | |

\* cited by examiner

BEARING UNIT AND SPEED REDUCER-EQUIPPED MOTOR

RELATED APPLICATIONS

The present application is a National Phase of International Application Number PCT/JP2022/038360 filed Oct. 14, 2022, which claims the benefit of priority from Japanese Patent Application No. 2022-010860, filed on Jan. 27, 2022.

BACKGROUND

Technical Field

The present disclosure relates to a bearing unit that rotatably supports a shaft placed in a gearbox, and a speed reducer-equipped motor to which the bearing unit is applied.

Background Art

A speed reducer-equipped motor that is used for, for example, an office machine and vehicle-mounted electrical equipment is conventionally known. Moreover, it is known that in a speed reducer-equipped motor, a plurality of components, such as a bearing that rotatably supports a shaft placed in a gearbox that stores a reduction drive, and a damper that regulates displacement of the shaft in the axial direction, is used in the vicinity of an end portion of the shaft (for example, Patent Literature 1).

CITATION LIST

Patent Literature

Patent Literature 1: JP-T-2000-510560

DISCLOSURE OF THE INVENTION

Problems to be Solved by the Invention

If it is necessary to handle a plurality of components such as a bearing and a damper individually in the above-mentioned speed reducer-equipped motor, it is required to assemble the plurality of components sequentially in the gearbox. Hence, there are problems such as the necessity to check the procedure and complicated work.

The present disclosure has been made considering the above problems, and one object thereof is to simplify a procedure for assembling a plurality of components attached to a shaft placed in a gearbox and to facilitate the assembly work of the plurality of components. Note that the present disclosure is not limited to this object, and another object of the present disclosure is to achieve functions and effects that are derived from each configuration illustrated in "DESCRIPTION OF PREFERRED EMBODIMENTS" to be described later, the functions and effects being hardly obtained by conventional techniques.

Solutions to the Problems (1) A bearing unit disclosed herein includes: a thrust damper extendable in an axial direction of a shaft placed in a gearbox, the movement of which toward one side in the axial direction is regulated; a shaft receiver component held by the thrust damper on the other side of the thrust damper in the axial direction; a metal holder that holds the shaft receiver component in such a manner as to be detachable in the axial direction; and an oilless metal held by the metal holder and placed on the other side of the shaft receiver component, in which the thrust damper, the shaft receiver component, the metal holder, and the oilless metal are integrated all together before being incorporated into the gearbox.

(2) Preferably, the metal holder includes a press-fit end portion press-fitted and fixed in a storage portion of the gearbox. In this case, preferably, the shaft receiver component is light press-fitted in the metal holder before being incorporated into the gearbox, is pressed toward the one side by the shaft after being incorporated into the gearbox to terminate the light press-fitted state in the metal holder, and is held in such a manner as to be slidable in the axial direction relative to the metal holder.

(3) Preferably, the shaft receiver component includes: a damper-side press-fit portion press-fitted in an inner hole of the tubular thrust damper; a flange portion in contact with an end surface on the other side of the thrust damper; and a holder-side press-fit portion that extends from the flange portion toward the other side, and has a tubular surface. In this case, preferably, the metal holder includes: a press-fit end portion press-fitted and fixed in the storage portion of the gearbox; a protruding piece that extends from the press-fit end portion toward the one side, to which the tubular surface of the holder-side press-fit portion is light press-fitted; and a holding piece that extends from the press-fit end portion toward the one side, and holds the oilless metal, and the oilless metal is placed on the one side of the press-fit end portion of the metal holder.

(4) In the above case of (3), preferably, the shaft receiver component includes a guide portion that extends from the holder-side press-fit portion toward the other side, and has a tubular surface of a smaller diameter than that of the holder-side press-fit portion, and the shaft receiver component is pressed toward the one side by the shaft after being incorporated into the gearbox to terminate the light press-fitted state in the metal holder, and the guide portion is held in such a manner as to be slidable in the axial direction relative to the protruding piece of the metal holder.

(5) Preferably, the holding piece of the metal holder is shorter in the axial direction and thinner in a radial direction than the protruding piece of the metal holder.

(6) In the above case of (5), preferably, the press-fit end portion of the metal holder includes, in a part of an outer peripheral surface thereof, a positioning surface formed into a plane surface. In this case, preferably, the metal holder is formed in such a manner that the protruding piece is placed in a position that receives radial load acting on the shaft upon being press-fitted and fixed with the positioning surface aligned with a predetermined position of the storage portion.

(7) Preferably, the metal holder includes a plurality of the protruding pieces and a plurality of the holding pieces. In this case, preferably, the protruding pieces and the holding pieces are alternately provided in a circumferential direction, and form an inner peripheral surface surrounding the oilless metal.

(8) Preferably, the press-fit end portion of the metal holder has an annular shape, and includes a shaft guide surface of which the inner peripheral surface reduces in an inner diameter from an end surface on the other side toward the one side.

(9) Preferably, in a cross section of the metal holder cut along the axial direction, a portion, which is closer to the press-fit end portion, of an inner surface, which faces the oilless metal, of the protruding piece has a curved surface that curves along an outer peripheral surface of the oilless metal, and a portion, which is closer to the press-fit end portion, of an inner surface, which faces the oilless metal, of the holding piece extends not along the outer peripheral surface of the oilless metal but in the axial direction.

(10) Preferably, a shaft contact portion that comes into contact with the shaft is formed on an end surface on the other side of the shaft receiver component, and the shaft contact portion has a shape that allows storage of grease.

Moreover, a speed reducer-equipped motor disclosed herein includes: a motor unit having a shaft; a reduction drive having a worm that rotates integrally with the shaft of the motor unit, and a worm wheel that meshes with the worm; and a gearbox to which the motor unit is attached, the gearbox storing the reduction drive, in which the bearing unit according to any of (1) to (10) above is used at an end portion of the shaft placed in the gearbox.

Effects of the Invention

According to the bearing unit and the speed reducer-equipped motor of the disclosure, it is possible to simplify a procedure for assembling a plurality of components attached to a shaft and to facilitate the assembly work of the plurality of components.

DESCRIPTION OF PREFERRED EMBODIMENTS

A bearing unit and a speed reducer-equipped motor as an embodiment are described with reference to the drawings. The embodiment that appears below is a mere example, and is not intended to exclude various modifications and technical applications, which are not specified in the following embodiment. Each of configurations of the embodiment can be carried out with various modifications within a scope that does not depart from a gist of the configuration. Moreover, it is possible to make the choice of which configuration to use as needed, or the configurations can be combined as appropriate.

[1. Configuration]

Figure 1:
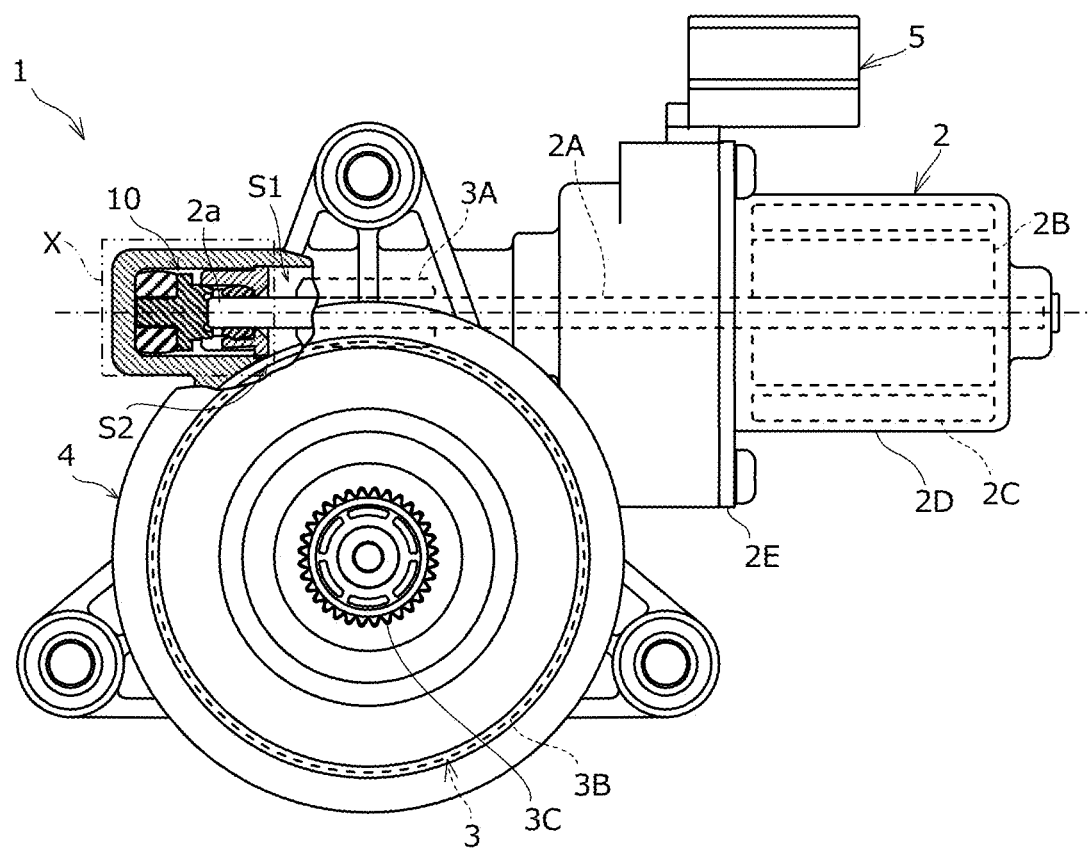
FIG. 1 is a plan view of a speed reducer-equipped motor according to an embodiment, and illustrates main elements in cross section.

FIG. 1 is a plan view of a speed reducer-equipped motor 1 (hereinafter referred to as the "motor 1") according to the embodiment, and illustrates main elements in cross section. In FIG. 1, the motor 1 is assumed to be at rest. The motor 1 is applied to, for example, a power window system of a vehicle. As illustrated in FIG. 1, the motor 1 includes a motor unit 2 as a drive source, a reduction drive 3 that reduces and outputs the rotational speed of the motor unit 2, and a gearbox 4 that stores the reduction drive 3.

The motor unit 2 includes a shaft 2A that extends outwardly from one side of a housing 2D, and is placed in the gearbox 4. Hereafter a direction of an axis of the shaft 2A in a state where the motor unit 2 is coupled to the gearbox 4 is referred to as the "axial direction," and a direction where the shaft 2A extends out of the housing 2D (leftward in FIG. 1) is referred to as "one side," and the opposite direction (rightward in FIG. 1) is referred to the "other side." A bearing unit 10 according to the embodiment is used at an end portion 2a on one side of the shaft 2A. The bearing unit 10 supports the shaft 2A rotatably, and regulates the displacement of the shaft 2A.

The motor unit 2 is, for example, a brushed DC motor, and includes a rotor 2B and a stator 2C that are built into the housing 2D. The housing 2D has a bottomed cylindrical shape. A flange portion 2E provided around an opening (not illustrated) of the housing 2D is coupled to the gearbox 4 from the other side via a fastening member. The shaft 2A is an output shaft of the motor unit 2 that rotates integrally with the rotor 2B. An end on the other side of the shaft 2A is supported by the housing 2D.

The reduction drive 3 includes a worm 3A that is fixed to the shaft 2A and rotates integrally with the shaft 2A, and a worm wheel 3B that has toothing that meshes with the worm 3A. The worm 3A is, for example, a crossed helical gear. The worm wheel 3B is a helical gear that meshes with the worm 3A. The worm wheel 3B is coupled to an output gear 3C that meshes with a gear provided to a driven member to drive the driven member.

The gearbox 4 is a case that stores the shaft 2A, the worm 3A, and the worm wheel 3B. A worm storage space S1 that stores the shaft 2A and the worm 3A, and a wheel storage space S2 that stores the worm wheel 3B are formed in the gearbox 4. The other side of the portion where the worm storage space S1 is formed is provided with a portion that is coupled to the motor unit 2. Moreover, the portion where the worm storage space S1 is formed may be provided with a portion that mates with a connector 5 having a function of feeding power to the motor unit 2 from the outside. The worm storage space S1 and the wheel storage space S2 communicate with each other in the area where the worm 3A meshes with the worm wheel 3B.

Figure 2:
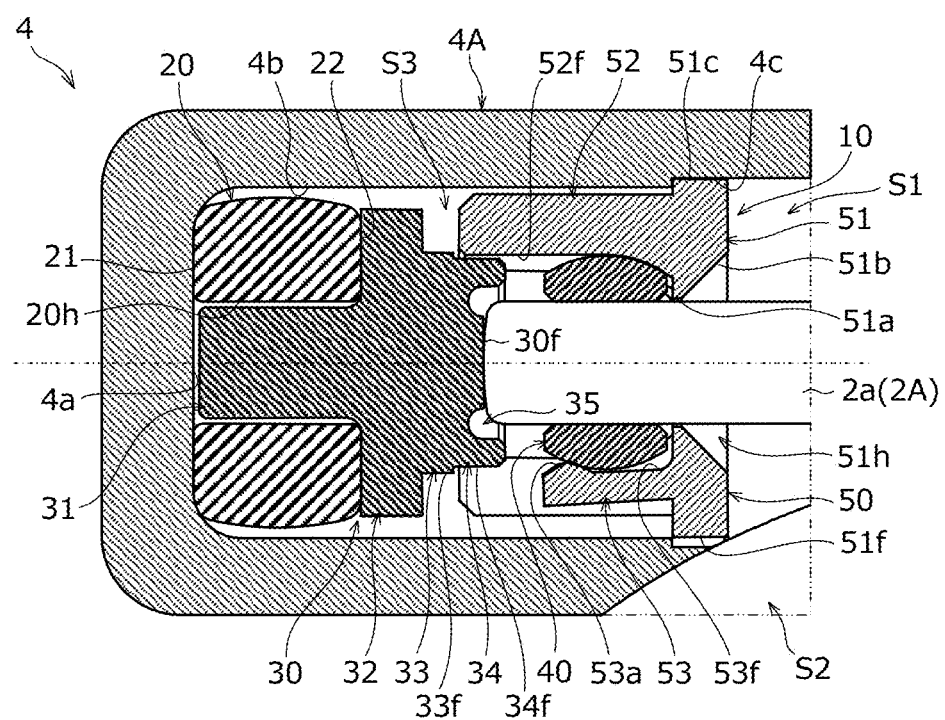
FIG. 2 is an enlarged view of part X (a bearing unit) of FIG. 1.

FIG. 2 illustrates an enlarged view of part X of FIG. 1. As illustrated in FIG. 2, the gearbox 4 includes a storage portion 4A that forms a bearing storage space S3 expanding toward one side relative to the worm storage space S1. The bearing unit 10 of the embodiment is stored in the bearing storage space S3. The storage portion 4A includes an end wall 4a (an inner wall) that extends perpendicular to the axial direction on one side thereof in the axial direction, an approximately cylindrical inner peripheral wall 4b that extends from the end wall 4a toward the other side and is connected to the worm storage space S1, and a press-fit wall 4c located on the other side of the inner peripheral wall 4b.

A metal holder 50, which is described below, of the bearing unit 10 is press-fitted and fixed to the press-fit wall 4c. In the embodiment, the press-fit wall 4c except a part forms a cylindrical surface having an inner diameter that is slightly greater than the inner diameter of the inner peripheral wall 4b. The part (specifically, a part of the press-fit wall 4c that is closer to the worm wheel 3B) is formed into a plane surface that is parallel to the axial direction. In other words, the press-fit wall 4c has a shape obtained by cutting away a part of a circle along a line segment as viewed in the axial direction. A part of the plane surface (hereinafter referred to as the "plane portion") is a predetermined position that is aligned with a positioning surface 51f described below.

Figure 3:
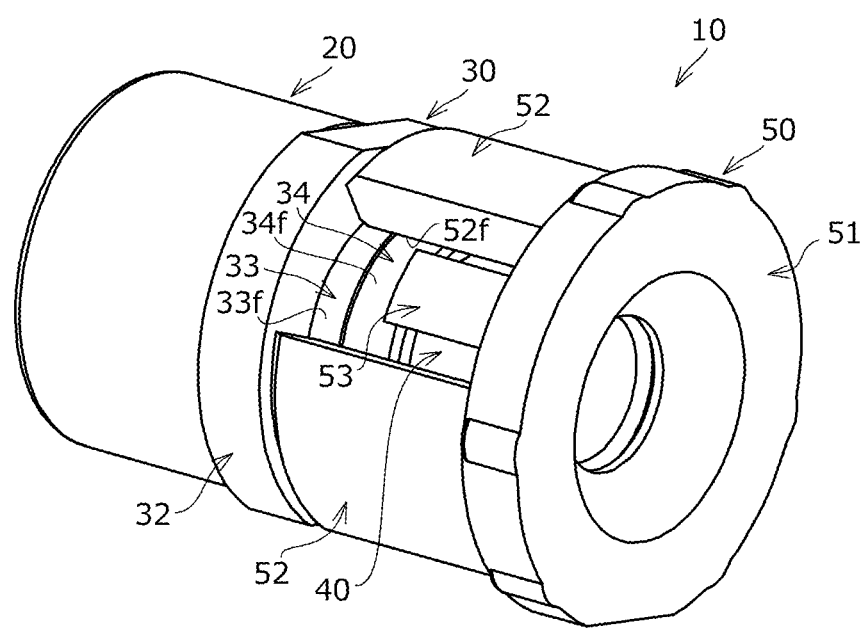
FIG. 3 is a perspective view illustrating a state of the bearing unit of FIG. 2 before being integrated into a gearbox.
Figure 4:
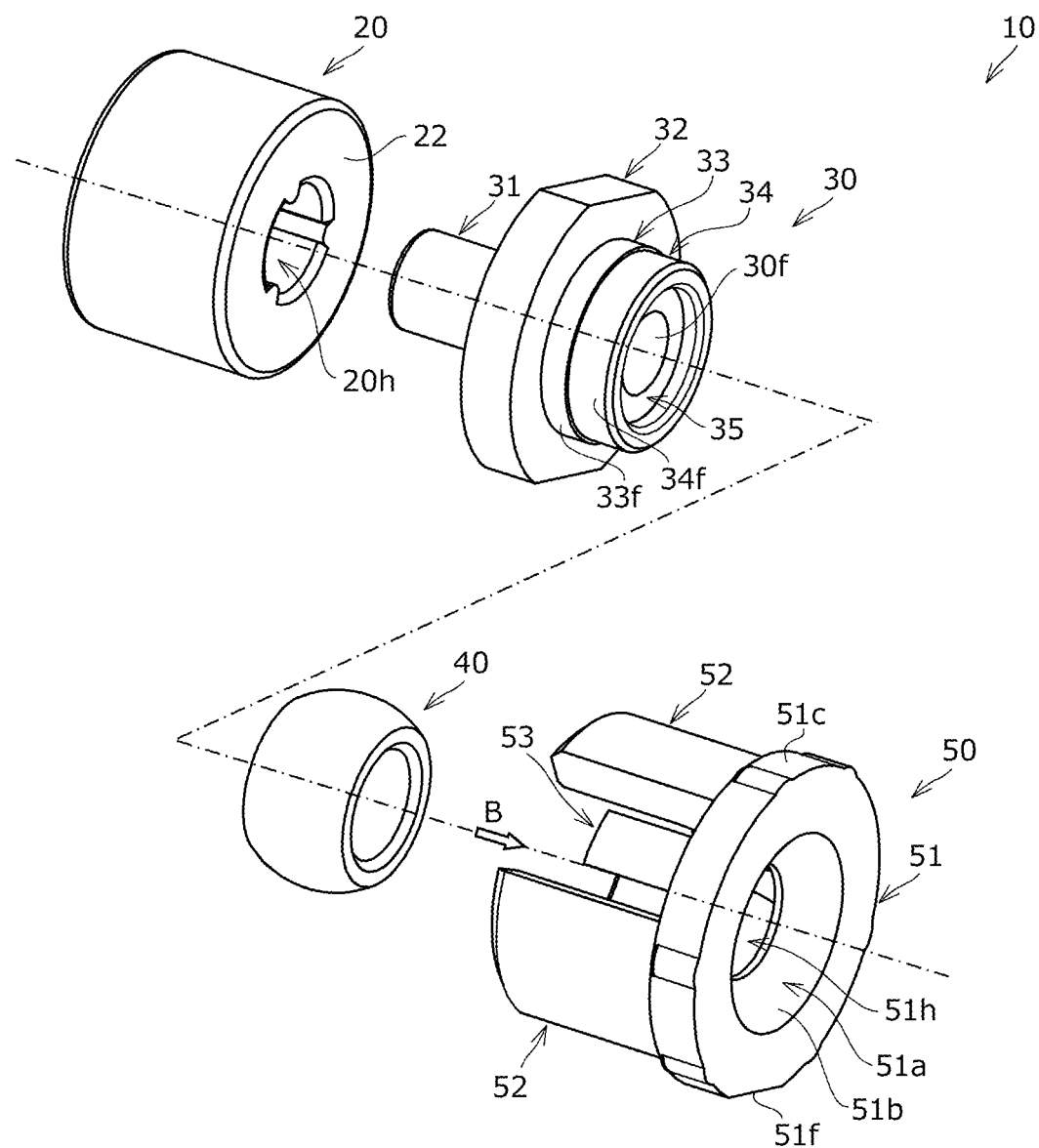
FIG. 4 is an exploded perspective view of the bearing unit of FIG. 3.

FIG. 3 is a perspective view of the bearing unit 10 before being incorporated into the gearbox 4. FIG. 4 is an exploded perspective view of the bearing unit 10 (a diagram illustrating a state before assembly). As illustrated in FIGS. 2 to 4, the bearing unit 10 includes a plurality of components 20, 30, 40, and 50. The plurality of components 20, 30, 40, and 50 is integrated together to be brought into a state illustrated in FIG. 3, that is, a state of being able to be handled as a single assembled bearing, before being incorporated into the gearbox 4. In this state, the bearing unit 10 is incorporated into the gearbox 4. In other words, the work of assembly to the gearbox 4 is required only once. The term integration means that at least upon incorporation of the bearing unit 10 into the gearbox 4, the positions of the plurality of components 20, 30, 40, and 50 are fixed relative to one another without the plurality of components 20, 30, 40, and 50 being detached from one another.

Moreover, the bearing unit 10 is incorporated into the gearbox 4, and then the shaft 2A is placed in the gearbox 4. As a result, the integrated state of the bearing unit 10 is terminated. The plurality of components 20, 30, 40, and 50 is placed in predetermined positions. Unless otherwise stated, a description is given below, assuming that the bearing unit 10 and the shaft 2A have been incorporated into the gearbox 4 and that the motor 1 is at rest.

The bearing unit 10 includes the thrust damper 20 that is in contact with the end wall 4a of the storage portion 4A, and the shaft receiver component 30 that is held by the thrust damper 20 from the opposite side of the thrust damper 20. Moreover, the bearing unit 10 includes the oilless metal 40 placed on the other side of the shaft receiver component 30, and the metal holder 50 that holds the shaft receiver component 30 and the oilless metal 40. The four components 20, 30, 40, and 50 are coaxially placed, aligned in the axial direction.

The thrust damper 20 is a tubular member made of a material that is stretchable in the axial direction (made of, for example, rubber). An end surface 21 on one side in the axial direction (hereinafter referred to as the "one-side end surface 21") of the thrust damper 20 is placed in contact with the end wall 4a of the storage portion 4A. The end wall 4a referred to here is simply required to stop a part of the thrust damper 20 (for example, the one-side end surface 21) and regulate the movement of the thrust damper 20 toward one side in the axial direction when the thrust damper 20 is pressed from the other side toward one side in the axial direction. Therefore, not only the inner wall of the gearbox 4 but also a portion or component such as a stopper can also be used. In other words, the thrust damper 20 may not be in direct contact with the gearbox 4.

An inner hole 20h where a damper-side press-fit portion 31, which is described below, of the shaft receiver component 30 is press-fitted is formed in the thrust damper 20. In the embodiment, as illustrated in FIG. 4, a plurality of ribs protruding inward in the radial direction is provided on an inner peripheral surface, which forms the inner hole 20h, of the thrust damper 20. The ribs are provided to enable the damper-side press-fit portion 31 to be press-fitted in the thrust damper 20 at an appropriate level that does not allow the shaft receiver component 30 to be detached from the thrust damper 20 even after the bearing unit 10 is incorporated into the gearbox 4. Moreover, the outer diameter of the thrust damper 20 is set to be less than the inner diameter of the inner peripheral wall 4b of the storage portion 4A. Consequently, a gap is formed between the thrust damper 20 and the inner peripheral wall 4b of the storage portion 4A.

The shaft receiver component 30 is a component that is held by the thrust damper 20 on the other side of the thrust damper 20 in the axial direction, and includes a receiving surface 30f that is in contact with the shaft 2A on one side. The shaft receiver component 30 has a function of transferring a displacement of the shaft 2A in a thrust direction to the thrust damper 20, and a function of integrating the bearing unit 10 together with the metal holder 50. The shaft receiver component 30 includes the damper-side press-fit portion 31 that is press-fitted in the inner hole 20h of the thrust damper 20, a flange portion 32 that is in contact with an end surface on the other side of the thrust damper 20 (hereinafter referred to as the "other-side end surface 22"), and a holder-side press-fit portion 33 that extends from the flange portion 32 toward the other side. The shaft receiver component 30 of the embodiment further includes a guide portion 34 that extends from the holder-side press-fit portion 33 toward the other side, and has a stepped shape formed by aligning four portions having different outer diameters in the axial direction. For example, a resin with high strength, stiffness and wear resistance is used for the shaft receiver component 30 to prevent damage and dust generation associated with the contact with the shaft 2A.

The damper-side press-fit portion 31 is a press-fit portion used to mate (integrate) the shaft receiver component 30 and the thrust damper 20 together. The damper-side press-fit portion 31 has a columnar shape (for example, a circular cylindrical shape) having an outer diameter that allows the damper-side press-fit portion 31 to be press-fitted in the inner hole 20h of the thrust damper 20. The axial dimension of the damper-side press-fit portion 31 is less than the axial dimension of the thrust damper 20 and, as illustrated in FIG. 2, is set at a length that allows formation of a slight gap between an end surface on one side of the damper-side press-fit portion 31 and the end wall 4a of the storage portion 4A while the motor 1 is at rest. The gap absorbs a load and an impact in the thrust direction on the shaft 2A at a sufficient level when the motor 1 is being driven, and is set to be less than an expected displacement.

The flange portion 32 is an approximately disc-shaped portion having a larger diameter than the damper-side press-fit portion 31. A surface, which faces one side, of the flange portion 32 is in contact with the other-side end surface 22 of the thrust damper 20. The outer diameter of the flange portion 32 is formed in such a manner as to have a sufficient size that does not allow the flange portion 32 to be buried in the inner hole 20h when the shaft receiver component 30 is pressed by the shaft 2A from the other side toward one side in the axial direction, and to be less than the inner diameter of the storage portion 4A. The outer diameter of the flange portion 32 is set to be equal to, for example, the outer diameter of the thrust damper 20. As illustrated in FIG. 4, the flange portion 32 of the embodiment has a shape obtained by cutting away two outer peripheral portions that are 180° out of phase along line segments. For example, the portions cut along the line segments may be formed by being set in positions of gates when the shaft receiver component 30 is injection-molded, or may be formed by cutting.

The holder-side press-fit portion 33 is a light press-fit portion used to temporarily mate (integrate) the shaft receiver component 30 and the metal holder 50 together. The holder-side press-fit portion 33 includes a tubular surface 33f that can be light press-fitted to protruding pieces 52, which are described below, of the metal holder 50, and is formed into, for example, a circular cylindrical shape. The outer diameter of the tubular surface 33*f* of the holder-side press-fit portion 33 is set to be less than the outer diameter of the flange portion 32. As described below, the light press-fitted state of the holder-side press-fit portion 33 is terminated upon assembly of the shaft 2A.

The guide portion 34 is a portion that guides the shaft receiver component 30 in the axial direction relative to the metal holder 50 after the light press-fitted state of the shaft receiver component 30 and the metal holder 50 is terminated. The guide portion 34 has a tubular surface 34*f* that has a smaller diameter than the tubular surface 33*f* of the holder-side press-fit portion 33, and is formed into, for example, a circular cylindrical shape. Even after the light press-fitted state of the shaft receiver component 30 and the metal holder 50 is terminated, the shaft receiver component 30 is not completely detached from (does not come out of) the metal holder 50, and the guide portion 34 maintains the coaxial state.

A shaft contact portion 35 that is in contact with the shaft 2A is formed on an end surface on the other side of the shaft receiver component 30 of the embodiment. The shaft contact portion 35 has a shape that allows storage of grease. A description is given, assuming that the shaft contact portion 35 is the recessed portion 35 that is recessed in a radially inner portion of an end surface on the other side of the guide portion 34. The above receiving surface 30*f* is provided to the recessed portion 35.

The receiving surface 30*f* is preferably formed into a flat shape. An end surface of the shaft 2A that is in contact with the receiving surface 30*f* is preferably formed into a spherical surface that curves toward the receiving surface 30*f*. Consequently, the contact between the shaft 2A and the receiving surface 30*f* is made point contact, and the contact area can be reduced. Therefore, it is possible to prevent wear and dust generation associated with the contact with the shaft 2A. Instead, the receiving surface 30*f* is formed into a spherical shape that curves toward the end surface of the shaft 2A, and the end surface of the shaft 2A that is in contact with the receiving surface 30*f* is formed into a flat shape, thereby making the contact between the shaft 2A and the receiving surface 30*f* point contact. Therefore, a similar effect can be obtained.

The recessed portion 35 of the embodiment is provided with a recessed groove that functions as a grease reservoir that stores grease for improving lubricity and wear resistance, in such a manner as to surround the radially outer side of the receiving surface 30*f*. However, the groove may be omitted. In other words, the recessed portion 35 can have a simple channel shape that opens to the other side as long as it has a shape that allows storage of even a little amount of grease. Moreover, the receiving surface 30*f* may have, for example, a concave shape in addition to a convex shape or a flat shape.

The oilless metal 40 is an annular universal bearing component that includes an inner peripheral surface that can slide against the shaft 2A, and an outer peripheral surface formed into a spherical shape. The oilless metal 40 is impregnated with lubrication oil, and rotates and supports the shaft 2A in a through-hole in the center.

The metal holder 50 has both of a function of fixing the bearing unit 10 within the storage portion 4A and, as described above, the function of integrating the bearing unit 10 together with the shaft receiver component 30, in addition to the function of holding the oilless metal 40. The metal holder 50 holds the shaft receiver component 30 in such a manner as to be detachable in the axial direction. The metal holder 50 is described in detail below.

Figure 5:
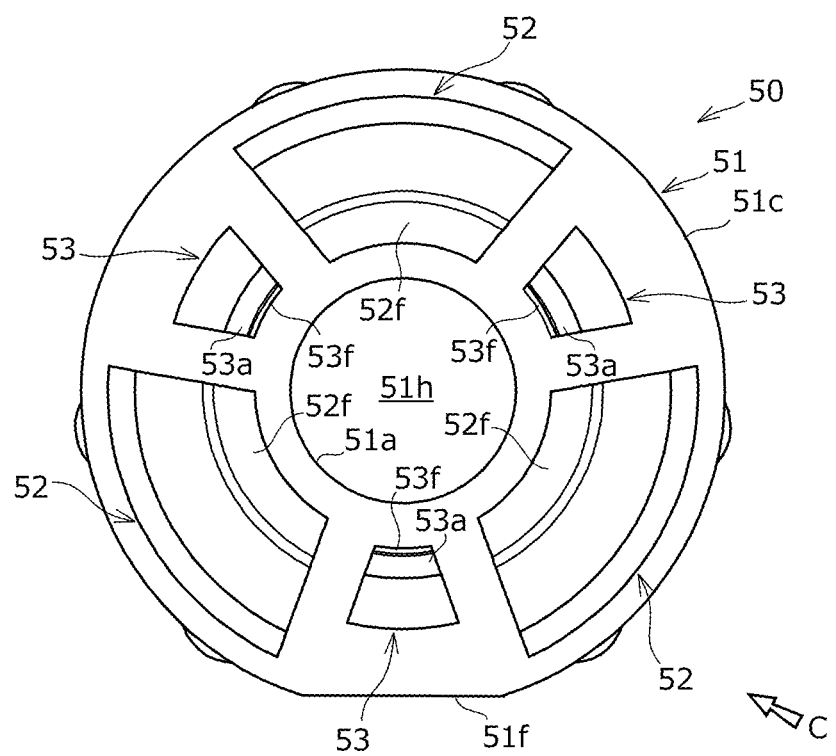
FIG. 5 is diagram of a metal holder included in the bearing unit of FIG. 2 as viewed from one side in an axial direction (in a direction of an arrow B in FIG. 4).
Figure 6:
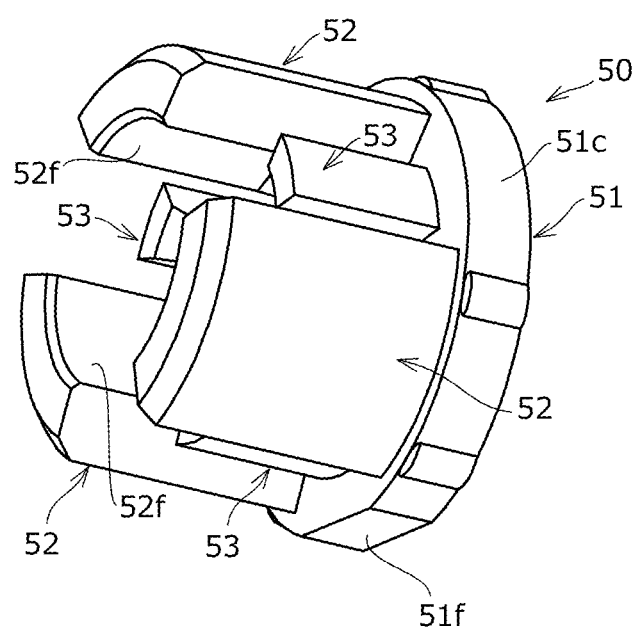
FIG. 6 is a perspective view of the metal holder of FIG. 5.

FIG. 5 is a plan view of the metal holder 50 as viewed from one side in the axial direction (in a direction of an arrow B in FIG. 4). FIG. 6 is a perspective view of the metal holder 50 as viewed from one side in the axial direction and from the worm wheel 3B (a direction of an arrow C in FIG. 5). The metal holder 50 includes a press-fit end portion 51 that is press-fitted to the press-fit wall 4*c* of the storage portion 4A, and the protruding pieces 52 and holding pieces 53 that extend from an end surface on one side of the press-fit end portion 51 toward one side in the axial direction. For example, resin is used for the metal holder 50. The resin may be similar to the resin forming the shaft receiver component 30, or preferably a resin that has excellent flexibility to a certain extent rather than strength, stiffness, and wear resistance since the metal holder 50 does not have reasons such as the contact with the shaft 2A as in the shaft receiver component 30 and requires a deformation such as described below.

The press-fit end portion 51 is a portion that exerts the function of fixing the bearing unit 10 within the storage portion 4A, and has an annular shape that has a hole 51*h* through which the shaft 2A is inserted on the radially inner side. As illustrated in FIG. 2, an inner peripheral surface 51*a* of the press-fit end portion 51 where the hole 51*h* is formed includes a shaft guide surface 51*b* that reduces in an inner diameter from an end surface on the other side of the press-fit end portion 51 toward one side. The shaft guide surface 51*b* is a surface that guides the insertion of the shaft 2A, and may be provided all over the inner peripheral surface 51*a*, or may be provided to a portion, which is closer to the other side, of the inner peripheral surface 51*a*. The shaft guide surface 51*b* may be formed into a tapered or round surface, or may be formed into a surface of another shape that allows guiding the shaft 2A.

As illustrated in FIG. 5, the outer shape of the press-fit end portion 51 has a shape that fits to the press-fit wall 4*c* of the storage portion 4A. In the embodiment, the press-fit wall 4*c* is provided with the plane portion. Therefore, the outer shape of the press-fit end portion 51 also has a similar shape (a shape obtained by cutting away a part of a circle along a line segment as viewed in the axial direction). As illustrated in FIG. 6, the positioning surface 51*f* formed into a flat plate shape is provided on an outer peripheral surface 51*c* forming the outer shape of the press-fit end portion 51. The positioning surface 51*f* is aligned with the above-mentioned plane portion of the storage portion 4A when the bearing unit 10 is placed. For example, the positioning surface 51*f* may be formed by being set in a position of a gate when the metal holder 50 is injection-molded, or may be formed by cutting. Moreover, a plurality of ribs protruding outward in the radial direction is provided on a portion of the outer peripheral surface 51*c* except the positioning surface 51*f*. The ribs are pressed against the press-fit wall 4*c* when the bearing unit 10 is inserted into the storage portion 4A. Therefore, the bearing unit 10 is stably press-fitted and fixed in the storage portion 4A.

The protruding pieces 52 are portions that exert the function of integrating the bearing unit 10 together with the shaft receiver component 30. The holding pieces 53 are portions that exert the function of holding the oilless metal 40. As illustrated in FIG. 5, the protruding pieces 52 and the holding pieces 53 each have an arc shape as viewed in the axial direction and form an inner peripheral surface surrounding the oilless metal 40. The metal holder 50 including three protruding pieces 52 and three holding pieces 53 is illustrated by example in the embodiment. The three protruding pieces 52 and the three holding pieces 53 are alternately provided in the circumferential direction, spaced apart from each other, in such a manner as to surround the central hole 51*h*. The protruding pieces 52 have the same shape, and are placed in different positions (out of phase). The holding pieces 53 also have the same shape, and are placed in different positions (out of phase). The adjacent protruding pieces 52 and the adjacent holding pieces 53 are preferably placed around the central hole 51*h*, at regular intervals in the circumferential direction, to prevent the holding power of the oilless metal 40 and a force imposed on the shaft 2A from being one-sided.

As illustrated in FIG. 2, the protruding pieces 52 are longer in the axial direction than the holding pieces 53. Hence, a space within which the holder-side press-fit portion 33 and the guide portion 34 of the shaft receiver component 30 can be fitted is formed on one side relative to a distal end of the each of the holding pieces 53 and on a radially inner side (closer to the oilless metal 40) surrounded by a distal end portion of the each of the protruding pieces 52. A portion on the distal end side (one side) of an inner peripheral surface 52*f* (a surface facing radially inward) of the each of the protruding pieces 52 has a shape to which the tubular surface 33*f* of the holder-side press-fit portion 33 of the shaft receiver component 30 can be light press-fitted. Moreover, a portion on a proximal end side (closer to the press-fit end portion 51) of the inner peripheral surface 52*f* of the each of the protruding pieces 52 has a curved surface that curves along the spherical outer peripheral surface of the oilless metal 40 in a cross section of the metal holder 50 cut along the axial direction. Consequently, the metal holder 50 is in surface contact with the proximal end portion of the inner peripheral surface 52*f* of the each of the protruding pieces 52 along the surface shape of the oilless metal 40. Therefore, the oilless metal 40 can be held without looseness.

Moreover, one of the three protruding pieces 52 is placed in a position that receives radial load acting on the shaft 2A. A reaction force of the gear generated between the worm wheel 3B and the worm 3A (the radial load) acts on the shaft 2A of the embodiment from down to up in FIG. 2. Hence, the one of the three protruding pieces 52 is placed on the upper side in FIG. 2, that is, in a position that is 180° out of phase with (on the opposite side in the radial direction to) the positioning surface 51*f* of the press-fit end portion 51. In other words, the metal holder 50 is formed in such a manner that the protruding piece 52 is placed in the position that receives the radial load acting on the shaft 2A when the metal holder 50 is press-fitted and fixed with the positioning surface 51*f* aligned with the predetermined position of the storage portion 4A. The protruding pieces 52 are preferably formed rigid (hard to warp) by being made wider or thicker than the holding pieces 53, thereby ensuring that the protruding pieces 52 receive the radial load.

The holding pieces 53 are thinner in the radial direction than the protruding pieces 52, and are each provided at the distal end with a claw portion 53*a* that protrudes inward in the radial direction. The claw portions 53*a* prevent the oilless metal 40 held by the metal holder 50 from coming out of the metal holder 50 toward one side in the axial direction. The thickness of the holding pieces 53 in the radial direction is set at a thickness that allows generation of bending moment to an extent that does not inhibit the rotation of the oilless metal 40 placed inward in the radial direction. Consequently, the holding pieces 53 hold the oilless metal 40, while permitting the rotation of the oilless metal 40. A portion on a proximal end side (closer to the press-fit end portion 51) of an inner peripheral surface 53*f* (a surface facing inward in the radial direction) of the each of the holding pieces 53 extends in the axial direction, not along the spherical outer peripheral surface of the oilless metal 40 in a cross section of the metal holder 50 cut along the axial direction. In other words, the proximal end portion of the inner peripheral surface 53*f* of the each of the holding pieces 53 is formed in such a manner as to be flat in the cross section illustrated in FIG. 2.

[2. Functions]

The functions of the above-mentioned bearing unit 10 are described with reference to FIGS. 2, 3, 7, and 8. The components 20, 30, 40, and 50 are integrated together and then the bearing unit 10 is incorporated into the gearbox 4. The insertion and placement of the shaft 2A in the gearbox 4 allows the bearing unit 10 to terminate the state where the shaft receiver component 30 is light press-fitted in the metal holder 50. The components 20, 30, 40, and 50 are placed in the predetermined positions. Consequently, the bearing unit 10 enters a state of exerting its functions.

The specific procedure is described. Firstly, before incorporation into the gearbox 4, the oilless metal 40 is inserted into the radially inner side of the protruding pieces 52 and the holding pieces 53 of the metal holder 50, and is held in such a manner as to be rotatable relative to the metal holder 50. Moreover, the damper-side press-fit portion 31 of the shaft receiver component 30 is press-fitted in the inner hole 20*h* of the thrust damper 20. The holder-side press-fit portion 33 of the shaft receiver component 30 is light press-fitted to the protruding pieces 52 of the metal holder 50, which is holding the oilless metal 40. Consequently, as illustrated in FIG. 3, the components 20, 30, 40, and 50 of the bearing unit 10 is integrated into a single assembled bearing, and incorporated into the gearbox 4 in the integrated form. Grease is applied to the recessed portion 35 of the shaft receiver component 30 before or after incorporation into the gearbox 4.

Figure 7:
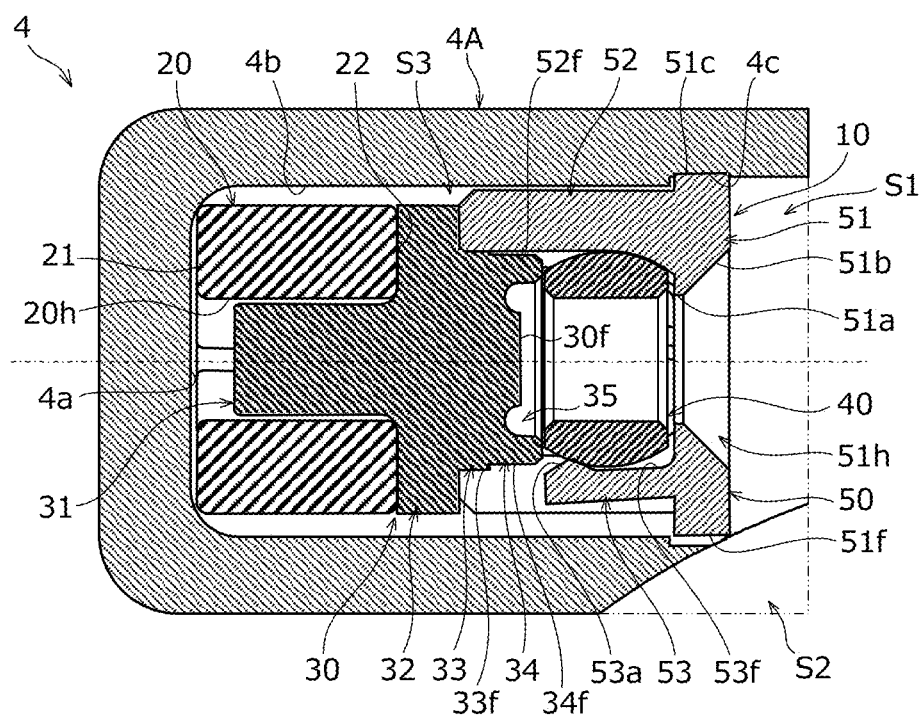
FIG. 7 is a diagram for explaining the functions of the bearing unit of FIG. 2.

FIG. 7 is a diagram illustrating a state where the bearing unit 10 has been incorporated into the gearbox 4 and before the shaft 2A is placed.

Only the press-fit end portion 51 of the metal holder 50 is press-fitted to the press-fit wall 4*c* of the gearbox 4 to incorporate the integrated bearing unit 10 into the gearbox 4. At this point in time, the press-fit end portion 51 of the metal holder 50 is placed in such a manner that the positioning surface 51*f* faces the portion, which has the flat plate shape, of the press-fit wall 4*c*. In other words, the bearing unit 10 is inserted into the storage portion 4A with the positioning surface 51*f* facing down in FIG. 7, and the press-fit end portion 51 is press-fitted to the press-fit wall 4*c* to be placed while performing positioning. Consequently, the one of the protruding pieces 52 of the metal holder 50 is placed in the position (the upper side in FIG. 7) that receives the radial load acting on the shaft 2A. The interior of the storage portion 4A is hardly visible from the outside so that it is difficult to fix the bearing unit 10 in an appropriate attitude. However, the presence of the positioning surface 51*f* allows the press-fitting of the press-fit end portion 51 to the press-fit wall 4*c* only when in the appropriate attitude. Therefore, the press-fitting and fixation is always achieved only in the appropriate attitude, and the occurrence of, for example, mounting mistakes can be prevented.

After the bearing unit 10 is incorporated into the gearbox 4, the shaft 2A is inserted and placed in the gearbox 4 as illustrated in FIG. 2. At this point in time, the shaft 2A is guided to the hole 51*h* by means of the shaft guide surface 51*b* of the metal holder 50, is passed through the hole 51*h* of the metal holder 50 and the through-hole of the oilless metal 40 sequentially to come into contact with the receiving surface 30f of the shaft receiver component 30. Furthermore, the shaft 2A is pressed toward one side in the axial direction to press the shaft receiver component 30. Consequently, the holder-side press-fit portion 33 of the shaft receiver component 30 is pushed out of the protruding pieces 52 of the metal holder 50 to terminate the light press-fitted state of the shaft receiver component 30 and the metal holder 50. In other words, the light press-fitted state of the shaft receiver component 30 and the metal holder 50 is automatically terminated without a special operation and an additional process, simply by assembling the motor unit 2 to the gearbox 4.

Consequently, the shaft receiver component 30 is held in such a manner as to be slidable in the axial direction relative to the metal holder 50. In detail, even when the shaft 2A is placed in the gearbox 4, the guide portion 34 of the shaft receiver component 30 does not come out of the protruding pieces 52 of the metal holder 50, and is held like a core in such a manner as to be slidable relative to the protruding pieces 52. Consequently, the radial positions of the metal holder 50 and the shaft receiver component 30 are not displaced, and the coaxial state thereof is maintained. Even when the shaft receiver component 30 is pressed in, by the shaft 2A, to a maximum limit possible from the viewpoint of the structure, the guide portion 34 does not come out of the protruding pieces 52, and the coaxial state is maintained.

Moreover, at this point in time, the thrust damper 20 is pressed toward one side by the shaft receiver component 30. Consequently, the force of the shaft 2A to press the shaft receiver component 30 toward one side is equal to the reaction force of the thrust damper 20. When the thrust damper 20 is pressed toward one side, the thrust damper 20 deforms in such a manner as to be reduced in the axial direction and bulge outward in the radial direction. However, even if the amount of press by the shaft receiver component 30 increases in accordance with the driving state of the motor 1 and the degree of bulging of the thrust damper 20 increases, the deformation of the thrust damper 20 is not inhibited by the inner peripheral wall 4b since there is the gap formed between the thrust damper 20 and the inner peripheral wall 4b as described above.

As described above, the bearing unit 10 incorporated into the gearbox 4 rotatably supports the end portion 2a of the shaft 2A. Moreover, the bearing unit 10 exerts a self-aligning function and a function of regulating the displacement of the shaft 2A in accordance with the drive of the motor 1.

Specifically, the oilless metal 40, which is held by the metal holder 50 in such a manner as to be rotatable, permits an inclination of a predetermined angle relative to the axis of the metal holder 50, and thereby the bearing unit 10 is self-aligned by the rotation of the shaft 2A. Moreover, when the motor 1 drives a driven member, the reaction force of the gear generated between the worm 3A and the worm wheel 3B (the radial load) may act on the shaft 2A. In the embodiment, the radial load acts from down to up in FIG. 2. At this point in time, in the above bearing unit 10, the protruding piece 52 of the metal holder 50 is placed on the upper side in FIG. 2 in such a manner as to receive the radial load on the surface thereof. Consequently, the movement of the shaft 2A in the radial direction (floating of the shaft 2A) is regulated.

Moreover, when the motor 1 drives a driven member, a force in the thrust direction that has been converted from a force in the rotational direction of the worm wheel 3B acts on the shaft 2A. The thrust damper 20 and the shaft receiver component 30 of the bearing unit 10 regulate the movement of the shaft 2A in the thrust direction (axial direction) by the force in the thrust direction.

Figure 8:
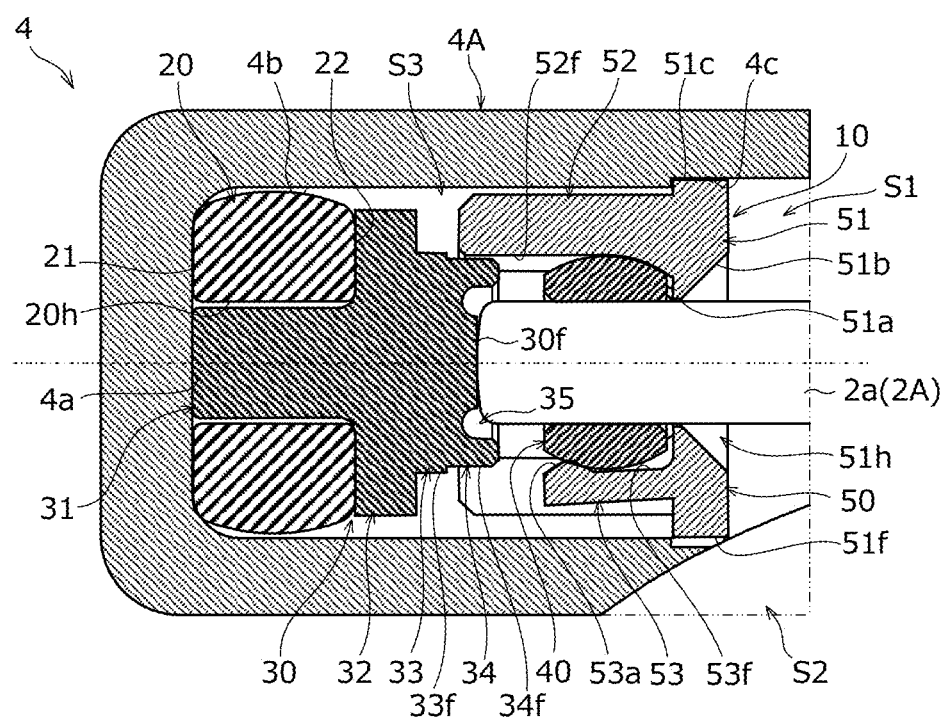
FIG. 8 is a diagram for explaining the functions of the bearing unit of FIG. 2.

FIG. 8 is a diagram illustrating a state where while the motor 1 is driven, the shaft 2A is displaced toward one side in the axial direction and the thrust force that presses the shaft receiver component 30 is acting. As illustrated in FIG. 8, when the thrust force acts on the bearing unit 10, the thrust damper 20 is reduced in the axial direction to absorb the thrust force, and the damper-side press-fit portion 31 of the shaft receiver component 30 comes into contact with the end wall 4a of the storage portion 4 to regulate the maximum displacement of the shaft 2A in the thrust direction.

Also at this point in time, the guide portion 34 of the shaft receiver component 30 does not come out of the protruding pieces 52 of the metal holder 50 and is located in the space on the radially inner side of the protruding pieces 52. Consequently, the metal holder 50 and the shaft receiver component 30 are not displaced in the radial direction, and maintain the coaxial state. The gap between the thrust damper 20 and the inner peripheral wall 4b is set in such a manner as to permit also the radially outward bulging deformation of the thrust damper 20 at this point in time (to not inhibit the deformation of the thrust damper 20).

When the rotation of the worm wheel 3B is reversed from the state of FIG. 8, the thrust force of displacement toward the other side in the axial direction acts on the shaft 2A. At this point in time, the thrust damper 20 extends in such a manner that a restoring force of the thrust damper 20 is equal to a drag force of the shaft 2A. Consequently, the bearing unit 10 enters, for example, the state of FIG. 2. Furthermore, the thrust damper 20 absorbs noise (reversal sound) that is generated when the worm wheel 3B reverses rotation.

[3. Effects]

(1) In the above-mentioned bearing unit 10 and the motor 1 to which the bearing unit 10 is applied, the components 20, 30, 40, and 50 are integrated into a single assembled bearing before the bearing unit 10 is incorporated into the gearbox 4. Consequently, the plurality of the components 20, 30, 40, and 50 to be attached to the end portion 2a of the shaft 2A can be placed all at once in the appropriate positions. Therefore, it is possible to simplify the assembly procedure and to facilitate the assembly work.

(2) When the above-mentioned bearing unit 10 is incorporated into the gearbox 4, only the press-fit end portion 51 of the metal holder 50 is press-fitted and incorporated into the gearbox 4. Therefore, it is possible to easily incorporate the bearing unit 10 into the gearbox 4. Moreover, the light press-fitted state of the shaft receiver component 30 and the metal holder 50 is terminated after incorporation into the gearbox 4. However, even after the termination, the guide portion 34 of the shaft receiver component 30 is not completely detached from the protruding pieces 52 of the metal holder 50, and is held in such a manner as to be slidable in the axial direction relative to the protruding pieces 52. Therefore, it is possible to maintain the coaxial state of the shaft receiver component 30 and the metal holder 50.

(3) The holding pieces 53 of the metal holder 50 are shorter in the axial direction and thinner in the radial direction than the protruding pieces 52. Consequently, it is possible to hold the oilless metal 40 with an appropriate amount of force when the oilless metal 40 is snap-fitted. Moreover, the protruding pieces 52 are set to be greater in thickness in the radial direction than the holding pieces 53. As a result, it is possible to press-fit the holder-side press-fit portion 33 in the radially inner side of the protruding pieces 52 and to ensure strength that enables the guide portion 34 to be held in such a manner as to be slidable in the axial direction. In other words, the protruding pieces 52 are made different in length in the axial direction from the holding pieces 53. As a result, it is possible to use the portions extending in the same direction (toward one side in the axial direction) for different purposes.

(4) The metal holder 50 is press-fitted and fixed with the positioning surface 51f provided to the press-fit end portion 51 of the metal holder 50 aligned with the predetermined position (the plane portion) of the storage portion 4A. Therefore, it is possible to place the protruding piece 52 of the metal holder 50 in the position that receives the radial load acting on the shaft 2A. In other words, the positioning surface 51f of the metal holder 50 allows regulating the position of the metal holder 50 in the circumferential direction in such a manner as to place the protruding piece 52 in the desired position. Such a positional relationship allows the protruding piece 52 that is thicker than the holding pieces 53 to ensure receiving the radial load acting on the shaft 2A and to prevent the floating of the shaft 2A.

Moreover, in the embodiment, the plane portion of the press-fit wall 4c facing the positioning surface 51 is provided closer to the worm wheel 3B. The side that is on the other side in the axial direction and is closer to the worm wheel 3B in the storage portion 4A also serves as the portion where the curved wheel storage space S2 is formed as illustrated in FIG. 2. Hence, the portion, which is closer to the worm wheel 3B, of the press-fit wall 4c is used as the plane portion for positioning. Therefore, it is possible to prevent a mold of the gearbox 4 from being made complicated.

(5) The metal holder 50 is provided with the plurality of (for example, three) protruding pieces 52 and the plurality of (for example, three, preferably equal in number to the protruding pieces 52) holding pieces 53. The protruding pieces 52 and the holding pieces 53 are alternately provided in the circumferential direction to form the inner peripheral surface surrounding the oilless metal 40. Consequently, it is possible to hold the oilless metal 40 in balance without reducing the sizes of the protruding pieces 52 and the holding pieces 53 too much. Moreover, it is also possible to ensure the size of the protruding pieces 52 that allows creation of the light press-fitted state (and the subsequent sliding state), and to place the protruding pieces 52 in balance.

(6) The press-fit end portion 51 of the metal holder 50 is provided with the shaft guide surface 51b. Therefore, when the shaft 2A is inserted into the gearbox 4, the shaft 2A can be easily guided to the inner hole 51h of the metal holder 50. Hence, the assembly work of the shaft 2A can be further facilitated.

(7) The proximal end portion of the inner peripheral surface 52f of the each of the protruding pieces 52 of the metal holder 50 has a curved surface that curves along the outer peripheral surface of the oilless metal 40. Therefore, it is possible to hold the oilless metal 40 also on the proximal end portions of the protruding pieces 52. Moreover, the proximal end portion of the inner peripheral surface 53f of the each of the holding pieces 53 of the metal holder 50 is formed in such a manner as to be flat in the cross section illustrated in FIG. 2. Therefore, the holding pieces 53 can be made easy to warp. Consequently, it is possible to further exert the snap-fit effect and to hold the oilless metal 40 with a more appropriate amount of force.

(8) Moreover, the recessed portion 35 is formed in the shaft receiver component 30. Therefore, it is possible to keep the grease that is applied to the receiving surface 30f in the recessed portion 35 and to improve lubrication performance during rotation of the shaft 2A.

[4. Others]

The configurations of the bearing unit 10 and the motor 1 that are described in the above-mentioned embodiment are examples, and the configurations of the bearing unit 10 and the motor 1 are not limited to the above-mentioned configurations. For example, the recessed portion 35 of the shaft receiver component 30 may be omitted. Conversely, the depth of the recessed portion 35 may be increased to set the axial position of the receiving surface 30f in a level difference position between the holder-side press-fit portion 33 and the guide portion 34 and in a position overlapping with the holder-side press-fit portion 33.

The gearbox 4 may be provided with a configuration substitute for the above guide portion 34. For example, the inner peripheral wall 4b may be provided with a structure that regulates the radial positions of the thrust damper 20 and the shaft receiver component 30 after the bearing unit 10 is incorporated into the gearbox 4. Moreover, the storage portion 4A of the gearbox 4 may be provided with a configuration that regulates the rotation of the shaft receiver component 30. For example, a portion cut along a line segment on an outer peripheral surface of the flange portion 32 of the shaft receiver component 30 may be used as a positioning surface, and a planar wall surface may be provided in a position, which faces the portion, of the inner peripheral wall 4b. The rotation of the shaft receiver component 30 is regulated; therefore, it is possible to suppress noise generated by the rotation of the shaft receiver component 30.

Moreover, the shapes of the proximal end portions of the inner peripheral surfaces 52f and 53f of the above-mentioned protruding pieces 52 and holding pieces 53 are examples, and the shapes of the proximal end portions are not limited to the above-mentioned shapes. For example, the proximal end portion of the inner peripheral surface 53f of the each of the holding pieces 53 may be curved, and the proximal end portion of the inner peripheral surface 52f of the each of the protruding pieces 52 may be made flat in cross section. The axial lengths and radial thicknesses of the protruding pieces 52 and the holding pieces 53 are not limited to the above-mentioned lengths and thicknesses, either. The numbers of the protruding pieces 52 and the holding pieces 53 are not limited to three, either. Moreover, the shaft guide surface 51b and the positioning surface 51f of the press-fit end portion 51 of the metal holder 50 may be omitted.

The shape of the inner hole 20h of the thrust damper 20 and the shape of the damper-side press-fit portion 31 of the shaft receiver component 30 are not limited to the above-mentioned shapes as long as the shapes allow the inner hole 20h and the damper-side press-fit portion 31 to maintain the press-fitted state. For example, both of the shape of the inner hole 20h of the thrust damper 20 and the shape of the damper-side press-fit portion 31 of the shaft receiver component 30 may be an elliptic shape or a rounded square shape. Moreover, the holding method of the shaft receiver component 30 by the thrust damper 20 is not limited to press-fitting. For example, the thrust damper 20 may hold the shaft receiver component 30 by engaging claw portions provided to the thrust damper 20 and the shaft receiver component 30 with each other.

Similarly, the shape of the distal end of the each of the protruding pieces 52 of the metal holder 50, and the shape of the holder-side press-fit portion 33 of the shaft receiver component 30 are not limited to the above-mentioned shapes, either, as long as the shapes allow the distal end and the holder-side press-fit portion 33 to maintain the light press-fitted state and to be detached. The holding method of the shaft receiver component 30 by the metal holder 50 is not limited to press-fitting, either, as long as the metal holder 50 can hold the shaft receiver component 30 in such a manner as to be detachable.

The bearing unit 10 may be used for a shaft other than the shaft 2A placed in the gearbox 4. Moreover, the configuration of the speed reducer-equipped motor 1 is not limited to the above-mentioned configuration. The speed reducer-equipped motor 1 may be applied to those other than a power window system of a vehicle.

The invention claimed is:

1. A bearing unit, comprising:
    a thrust damper extendable in an axial direction of a shaft placed in a gearbox, the movement of which toward one side in the axial direction is regulated;
    a shaft receiver component held by the thrust damper on the other side of the thrust damper in the axial direction;
    a metal holder that holds the shaft receiver component in such a manner as to be detachable in the axial direction; and
    an oilless metal held by the metal holder and placed on the other side of the shaft receiver component,
    wherein the thrust damper, the shaft receiver component, the metal holder, and the oilless metal are integrated all together before being incorporated into the gearbox,
    the metal holder includes a press-fit end portion press-fitted and fixed in a storage portion of the gearbox, and
    the shaft receiver component is light press-fitted in the metal holder before being incorporated into the gearbox, is pressed toward the one side by the shaft after being incorporated into the gearbox to terminate a light press-fitted state in the metal holder, and is held in such a manner as to be slidable in the axial direction relative to the metal holder.

2. The bearing unit according to claim 1, wherein the shaft receiver component includes:
    a damper-side press-fit portion press-fitted in an inner hole of the thrust damper in a tubular shape;
    a flange portion in contact with an end surface on the other side of the thrust damper; and
    a holder-side press-fit portion that extends from the flange portion toward the other side, and has a tubular surface,
    the metal holder includes:
    a protruding piece that extends from the press-fit end portion toward the one side, to which the tubular surface of the holder-side press-fit portion is light press-fitted; and
    a holding piece that extends from the press-fit end portion toward the one side, and holds the oilless metal, and
    the oilless metal is placed on the one side of the press-fit end portion of the metal holder.

3. The bearing unit according to claim 2, wherein the shaft receiver component includes a guide portion that extends from the holder-side press-fit portion toward the other side, and has a tubular surface of a smaller diameter than that of the holder-side press-fit portion, and the shaft receiver component is pressed toward the one side by the shaft after being incorporated into the gearbox to terminate the light press-fitted state in the metal holder, and the guide portion is held in such a manner as to be slidable in the axial direction relative to the protruding piece of the metal holder.

4. The bearing unit according to claim 2, wherein the holding piece of the metal holder is shorter in the axial direction and thinner in a radial direction than the protruding piece of the metal holder.

5. The bearing unit according to claim 4, wherein the press-fit end portion of the metal holder includes, in a part of an outer peripheral surface thereof, a positioning surface formed into a plane surface, and the metal holder is formed in such a manner that the protruding piece is placed in a position that receives radial load acting on the shaft upon being press-fitted and fixed with the positioning surface aligned with a predetermined position of the storage portion.

6. The bearing unit according to claim 2, wherein the metal holder includes a plurality of the protruding pieces and a plurality of the holding pieces, and the protruding pieces and the holding pieces are alternately provided in a circumferential direction, and form an inner peripheral surface surrounding the oilless metal.

7. The bearing unit according to claim 2, wherein the press-fit end portion of the metal holder has an annular shape, and includes a shaft guide surface of which an inner peripheral surface reduces in an inner diameter from an end surface on the other side toward the one side.

8. The bearing unit according to claim 2, wherein in a cross section of the metal holder cut along the axial direction,
    a portion, which is closer to the press-fit end portion, of an inner surface, which faces the oilless metal, of the protruding piece has a curved surface that curves along an outer peripheral surface of the oilless metal, and
    a portion, which is closer to the press-fit end portion, of an inner surface, which faces the oilless metal, of the holding piece extends not along the outer peripheral surface of the oilless metal but in the axial direction.

9. The bearing unit according to claim 2, wherein a shaft contact portion that comes into contact with the shaft is formed on an end surface on the other side of the shaft receiver component, and the shaft contact portion has a shape that allows storage of grease.

10. A speed reducer-equipped motor comprising:
    a motor unit including a shaft;
    a reduction drive including a worm that rotates integrally with the shaft of the motor unit, and a worm wheel that meshes with the worm; and
    a gearbox to which the motor unit is attached, the gearbox storing the reduction drive,
    wherein the bearing unit according to claim 1 is used at an end portion of the shaft placed in the gearbox.

* * * * *